United States Patent
Appenzeller et al.

(10) Patent No.: US 8,756,289 B1
(45) Date of Patent: Jun. 17, 2014

(54) MESSAGE AUTHENTICATION USING SIGNATURES

(75) Inventors: Guido Appenzeller, Menlo Park, CA (US); Timothy Y. Choi, San Mateo, CA (US); Matthew J. Pauker, San Francisco, CA (US)

(73) Assignee: Voltage Security, Inc., Cupertino, CA (US)

( * ) Notice: Subject to any disclaimer, the term of this patent is extended or adjusted under 35 U.S.C. 154(b) by 0 days.

(21) Appl. No.: 13/476,792

(22) Filed: May 21, 2012

Related U.S. Application Data

(63) Continuation of application No. 12/703,177, filed on Feb. 9, 2010, now abandoned, which is a continuation of application No. 10/951,975, filed on Sep. 28, 2004.

(60) Provisional application No. 60/508,666, filed on Oct. 3, 2003.

(51) Int. Cl.
*G06F 15/173* (2006.01)

(52) U.S. Cl.
USPC .......................................... 709/206

(58) Field of Classification Search
None
See application file for complete search history.

(56) References Cited

U.S. PATENT DOCUMENTS

| | | | |
|---|---|---|---|
| 4,206,315 A | 6/1980 | Matyas et al. | |
| 4,405,829 A | 9/1983 | Rvest et al. | |
| 4,868,877 A | 9/1989 | Fischer | |
| 6,356,935 B1 | 3/2002 | Gibb | |
| 6,493,709 B1 | 12/2002 | Aiken | |
| 6,986,049 B2 | 1/2006 | Delany | |
| 7,117,367 B2 | 10/2006 | Carro | |
| 7,313,700 B2 | 12/2007 | Delany | |
| 7,320,020 B2 | 1/2008 | Chadwick et al. | |
| 7,472,163 B1 * | 12/2008 | Ben-Yoseph et al. | 709/206 |
| 2002/0007453 A1 | 1/2002 | Nemovicher | |
| 2003/0050981 A1 | 3/2003 | Banerjee et al. | |
| 2003/0226033 A1 * | 12/2003 | Zinda et al. | 713/201 |
| 2004/0205135 A1 | 10/2004 | Hallam-Baker | |
| 2005/0169476 A1 | 8/2005 | Little et al. | |

* cited by examiner

*Primary Examiner* — Scott Christensen
(74) *Attorney, Agent, or Firm* — Treyz Law Group; G. Victor Treyz; Michael H. Lyons

(57) ABSTRACT

Systems and methods are provided for using digital signatures to help distinguish legitimate email from known or trusted organizations from unsolicited email or forged email. Digital signatures may be used in an email body, mail header, or embedded links. The signatures may be verified by a recipient or internet service provider and may be used in conjunction with spam filtering applications.

20 Claims, 10 Drawing Sheets

MESSAGE AUTHENTICATION USING SIGNATURES

This application is a continuation of patent application Ser. No. 12/703,177, filed Feb. 9, 2010, now abandoned which is a continuation of patent application Ser. No. 10/951,975, filed Sep. 28, 2004, which claims the benefit of provisional patent application No. 60/508,666, filed Oct. 3, 2003, which are hereby incorporated by reference herein in their entireties.

BACKGROUND OF THE INVENTION

This invention relates to digital signatures and email, and more particularly, to systems and methods that use digital signatures to distinguish trusted from untrusted email.

Electronic messaging has become an important tool for communications between businesses and with customers. One major problem with electronic messaging is that the mechanism that authenticates the sender of a mail is fairly weak. The currently most frequently used system relies on the messaging server of the sending entity to correctly identify both itself and the sender of the email. By setting up their own messaging server, a potential malicious user can easily circumvent this mechanism. Two examples of malicious users abusing this system are spam and social engineering. They occur most frequently in the context of email, however they are not limited to this specific type of electronic messaging.

Spam is usually unsolicited commercial email that is sent by a sender to a large number (often millions) of recipients to advertise a product or service. As spam is often illegal, the sender of spam will often try to disguise their identity. By setting up their own mail server they can easily do this. The mail server of the recipient currently has no effective mechanism that it can use to verify if the sender of a mail message is genuine or not.

With social engineering ploys, a forged email is sent to a recipient that appears to be sent by an entity that the recipient knows or trusts. The message content attempts to trick the recipient into performing actions that can be exploited by the sender. For example a sender could send an email that appears to be from the recipient's bank. This email could ask the recipient to go to a specific web page and enter his credentials for the bank's web site. This web page could appear to be an official web page from the bank, however, it would really be controlled by the malicious sender. The sender would obtain the recipient's login credentials for the real bank web site and could use them for withdrawing or transferring money from the recipient's bank account. By sending the forged email to a large number of recipients, a malicious sender can do substantial amounts of damage.

Digital signatures are a mechanism that can be used to prove the authenticity of emails. A digital signature is usually based on or related to a public key cryptography system. A well known public key cryptography system is the RSA system. Another possible public key cryptography system is an identity-based encryption system. In such a system a sender can generate a private and public key pair. The sender may publish his public key and make it available to any interested party. Using the private key, the sender can cryptographically sign electronic messages, for example email. A recipient or network service provider can use the public key to verify the signature of an electronic message.

It is an object of the present invention to provide mechanisms that protect recipients from unsolicited or forged emails.

SUMMARY OF THE INVENTION

In accordance with the present invention, message signing systems and methods for using such systems are provided. The systems and methods of the invention protect recipients from receiving messages with forged sender identities.

A sender can digitally sign messages that are destined for recipients. Based on a published or well-known public key, the recipient or a network service provider may verify the authenticity of the message. If the recipient or message service provider trusts the identity of the sender, it may deliver the message to its recipients. It may do so even if other spam filtering methods detect that the message seemingly looks like spam.

A sender that is worried about recipients receiving falsified email may ask a network service provider to drop all messages from the sender that are not correctly signed. Alternatively functionality may be provided in client computers at recipients to verify the signatures from certain domains and to drop all unsigned email from senders at those domains.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
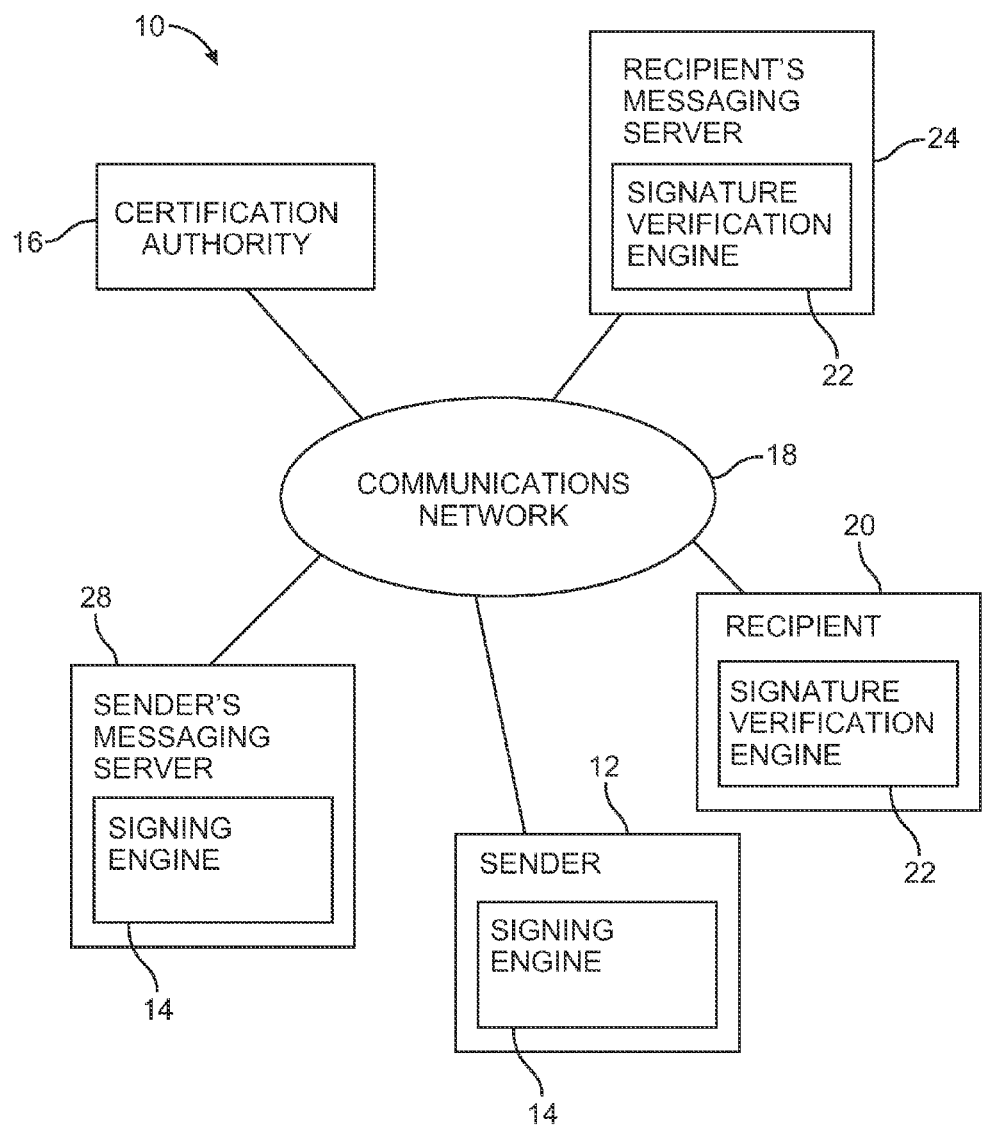
FIG. 1 is a diagram of an illustrative system for ensuring message authentication in accordance with the present invention.

A messaging system 10 in accordance with the present invention is shown in FIG. 1. A sender in system 10 may send a message using computing equipment 12 such as personal computers, handheld computers, mainframes, workstations, cellular phones with data messaging capabilities, etc. Communications network 18 may be any suitable network or combinations of networks such as local area networks, wide area networks, the telephone network, the Internet, etc. Senders may not be single individuals but instead groups or an organization. An example of a sender is a bank or financial institution that sends out financial data to its customers or partners via email. The sending equipment in this case may not be a single computer but a number of servers that share the load of generating and sending out the messages. For clarity we will still refer to a sender and sending equipment.

Messaging servers may be used in system 10 to transport messages between the sender and the recipient. When the sender's equipment 12 sends the message on the communications network 18, it may be stored and forwarded by a number of mail servers. For example an email message may be sent by the sender's equipment that is behind a firewall to the sender's messaging server 28. The messaging server then delivers it directly or indirectly to the recipient. In another example, the sender could be a small business that sends all messages via the mail server of its internet service provider (ISP). The ISP's mail server will then pass it on to the recipient's mail server. A message may be stored and forwarded several times between the sender and the recipient's mail server, however, for the invention, the exact number of messaging servers that a message transitions is not particularly significant.

Sometimes a recipient's computing equipment 20 may directly receive a message from the sender. However for many recipients it is impractical to be constantly connected to the network. For example a residential email user may turn off his computer overnight. Or a mobile phone user may turn off the mobile phone during meetings. For this reason, a recipient's messages may be stored on a messaging server 24. This messaging server is connected to the network 18 and may communicate directly or indirectly with the sender's computing equipment using a number of possible network or transport protocols. For example the recipient's messaging server could be a Microsoft Exchange server that receives messages form the sender via the SMTP protocol. In this example the user may retrieve the messages from the messaging server using the IMAP or POP3 protocols. Another example is an instant messaging server that receives an instant message and keeps it until the receiver's equipment 20 is connected to the network 18.

When a recipient's messaging server receives a message from the sender, it may not be able to verify the sender's identity. For example, in the SMTP protocol that is currently used on the internet to transmit mail messages, a recipient's messaging server has no way to reliably determine the identity of most sending mail servers.

The process of determining the identity of the sender is called authentication. A mail server may attempt to find out the true identity of a sender or sending messaging server by using a directory service that maps the network address of the sender to an identity. For example, for an email based system, a mail server may attempt to perform a so-called "reverse DNS lookup" that maps the IP address of the mail server (e.g. "171.64.64.64") to its domain name (e.g. "smtp.Stanford.edu"). If the domain name (e.g. "Stanford.edu") is identical to the domain of the sender (e.g. "Stanford.edu" if the sender's identity is "alice@Stanford.edu") the host may decide to accept the message. If the domain name differs (e.g. the domain name of the sender's mail server maps to "spamcorp.com") the recipient's mail server may reject it or mark it as potential spam. In practice, however, this approach has not proven to be effective, as the reverse lookup of network addresses to identities is not generally sufficiently reliable.

A different approach to verifying identity is through the use of digital signatures. Digital signatures were developed over 20 years ago and today are well understood and the technology for them is widely available. To use digital signatures, a sender uses a signature engine 14. This signature engine may be implemented in software that runs on the sender's equipment or it may be implemented using hardware that is built into it. A variety of algorithms for digital signatures exist and are widely available (see, e.g., www.openssl.org). Examples of signature algorithms are RSA signatures, elliptic-curve-based signatures, and identity-based signatures. Any digital signature algorithm may be used with the present invention.

One suitable digital signatures algorithm that may be used is the identity-based-encryption BLS algorithm (see, e.g., the article entitled "Short signatures from the Weil pairing" by Dan Boneh, Ben Lynn, and Hovav Shacham in Lecture Notes in Computer Science (2001)). The BLS algorithm uses Gap Diffie-Hellman groups with non-unity security multipliers to produce extremely short signatures. Another suitable digital signature algorithm is the DSA algorithm, as it is short and well-standardized.

To use a digital signature algorithm a sender obtains a public key and a private key. The method of obtaining these two keys depends on the environment and the algorithm used. For the RSA algorithm the sender may find two large prime numbers and derive from it the public key and the private key. For an identity-based-encryption (IBE) cryptographic system the sender may contact a so-called key server to obtain his private key. The private key is usually kept confidential while the public key is usually made publicly available to at least some external parties. Any method for obtaining a public key and private key can be used with the system.

The digital signature can be embedded into the message in a number of different ways. The PKCS7 message format can be used. This approach has the advantage of being well standardized and software for reading and generating this message format is publicly available on the Internet. Some signing engines may change the format of the body of the message. For example, some versions of the PKCS7 format may encode the body of the message with an encoding that converts the text representation of the message to a canonical format. One such canonical format is BASE64 encoding. The advantage of this format is that while the message is in transit it is much less likely that the message is modified. For example, some old mail servers are known to have problems with text lines over a certain length. Lines that are too long may be re-formatted (e.g., truncated or broken into several lines). The changes to the message caused by this formatting will likely cause the signature of the message to become invalid. Changing the main body of the message however has the disadvantage of increasing its size. For example, BASE64 encoding increases the size of a message by approximately 33 percent.

In some cases it may be advantageous to keep the message size overhead to a minimum. The signing engine may leave the main message body unchanged, compute the signature for the message and add it into the header. For example for an email system this can be done with an additional RFC822 header field, e.g.

"X-SpamSignature: 8F5D6ABBC89DDa"

This method keeps the overhead of a message to only a few tens of bytes. Old mail servers as described above may alter the message and thus render a message signature invalid. It may therefore be advantageous to first convert the message to a more robust format before the signature is calculated. For example, for email messages it is known that mail servers may break lines or modify certain characters such as the carriage return (CR) or line feed (LF) characters. For emails it may thus be advantageous to convert the message M to a new message M' that has all LF characters, all CR characters, and all other extraneous characters such as tabs and spaces removed and to compute the signature over this converted message.

The message that is sent out by the signature engine may still be the original, unconverted message M. However, the signature is the new signature that is calculated over the converted message M'. Any conversion algorithm may be used with the above scheme. Which conversion algorithm is most suitable for a specific message type will depend on the transport protocols that are used. The signature verification engine may perform the same conversion on the message M to obtain M'. It may then verify the signature on M'. If the signature on M' matches it may accept the message M as being signed by the sender. For clarity, we will always refer to signatures and signature verification on the message, even if this method of using signatures on converted messages is used.

Digital signatures may be verified using a signature verification engine 22. A number of such engines are publicly available (e.g., www.openssl.org). To verify a signature, the engine uses the signed message and the public key of the sender. If the public key corresponds to the private key that the message was signed with, the signature is accepted as valid. If the private key is only known to the sender, a digital signature proves that the message originated from the sender. A malicious sender that tries to impersonate the real sender could not generate the correct digital signature as it does not have the necessary private key.

A sender may use any suitable technique to distribute his public key to potential recipients. The sender may, for example, include his key in a directory of trusted senders. For example, a banking association may maintain and distribute a directory of trusted public keys of its members. A recipient may then consult this directory to identify if a message is authentic. It may be that the directory information is trusted as it is obtained over a trusted channel.

Alternatively, a sender may host its public key on a server that is associated with its domain. For example if the sender has the domain "bank.com", there may be a convention that the corresponding public key for this domain is hosted at "public key.bank.com" or any other server name that is derived from the identity. The server that hosts the keys may be further authenticated using a server certificate. For example, if the public key is obtained using the SSL or TLS protocol, a X509 web certificate may be used.

Another common way to authenticate public keys is using certificates. Certificates are well understood and frequently used on the internet to authenticate entities. The sender and the receiver in system 10 may trust a common entity, commonly called a certification authority. For example a company that offers commercial anti-spam solutions may verify the identity of senders and be a certification authority (CA) 16. It may additionally ask the senders to make a deposit that is forfeit in the case that the sender sends out unsolicited email to a recipient. The CA 16 may then issue a certificate that includes the identity of the sender and the public key of the sender and is signed by the company. The CA may also distribute its own public key as widely as possible. The advantage of certificates is that any recipient that has the CA's public key can verify the authenticity of the sender's public key. For example a sender could include the certificate in any outgoing mail message. A recipient would first verify the signature of the certificate using the public key of the CA. If it is correct, it would know that the public key in the certificate belongs to the sender. It could then verify the sender's signature using the public key in the certificate.

A certificate may either be issued directly to the sender's identity or to a sender's domain. For example, statements that are sent by a sender using the identity "info@bank.com" could either be signed with a public key from a certificate that belongs to "bank.com" or a certificate that belongs to "info@bank.com". The signature verification engine may be configured to require exact signatures of the sender's identity or it may just require a signature from the sender's domain. Either system can be used with the present invention.

To reduce message size it may be advantageous to reduce the size of the certificate. A sender may not include the sender's domain or identity in the certificate. Rather, the sender's domain or identity may be implicitly clear from the message. For example for an instant message, the sender's identity may be contained in the IM packet header. In this case it may be omitted from the certificate. The signature verification engine could re-create the complete certificate form the header. Various techniques for compressing certificates exist and any of these can be used with present invention.

An identity-based-encryption (IBE) signature scheme may be used to verify the sender's identity. With an identity-based signature scheme there is no need for certificates. Instead of using a traditional public key, an identity-based signature scheme uses the identity of the sender to verify the signature. The identity of the sender may either be sent with the message or it may be implicitly contained in the message. For example there may be a general convention that the identity assembled from parts of the message header (e.g. the "From:" field in an email message or the phone number for a SMS short message). Verifying the signature in an identity-based encryption system requires knowledge of the IBE public parameters being used in the identity-based encryption algorithm.

If several sets of IBE public parameters are used in a system, a recipient may obtain the correct public parameters in a number of ways.

For example, as described in commonly-assigned patent application Ser. No. 10/298,991, filed Nov. 14, 2002, which is hereby incorporated by reference herein in its entirety, a directory service may be used to provide users of the system with access to information that maps or associates particular groups of users with particular sets of public parameters. A recipient who desires public parameter information may consult the directory service.

As another example, as described in commonly-assigned patent application Ser. No. 10/607,195, filed Jun. 25, 2003, which is hereby incorporated by reference herein in its entirety, public parameter hosts may be used to host identity-based encryption public parameter information. A service name generation rule may be used to construct a service name that identifies the particular host that the recipient should contact to obtain the appropriate public parameter information.

The sender's equipment 12 may sign outgoing messages using the sender's private key. For example, if the sender is a bank, its outgoing mail server may send outgoing emails using the bank's private key. The signing of the message may be done by the equipment that generated the message. For example a secure statement delivery server may sign every statement it generates. Alternatively a gateway solution may be used. For example if the bank sends messages via a messaging server 28, the messaging server may use a signing engine 30 to sign all or a subset of outgoing messages. This implementation might be advantageous if it is difficult to add a signing engine to the system that generates the messages.

A recipient 20 may receive a message directly or via a messaging server 24 that is associated with the recipient. A recipient that receives a message may use the signature verification engine to verify the authenticity of a message. If a message is signed by the sender the recipient may take specific actions based on this fact. Note that generally a message may be signed by a sender or by a sender's domain. For clarity, we will simply refer to the message as being "signed" in both cases. As described above, verifying the signature of a message may involve verifying a certificate, obtaining the public key of the sender and potentially other steps. For clarity, operations such as these may be referred to as "verifying the signature."

If the recipient uses a messaging server that is associated with the recipient, this messaging server may use a signature verification engine to verify the signature on a message. For example if the recipient is a consumer, the ISP that accepts email for the consumer could run the signature verification engine. Depending on whether the signature is correct, the messaging server may perform specific actions with the message as described below.

One way to use the above system to combat spam and forged emails is to require all messages that a user or messaging server receives to be signed. Any unsigned message or message for which the signature is incorrect will be discarded. This approach is very effective as now a valid, verifiable signature is necessary for any sender. This requires, however, that all senders use a signing engine and participate in this system. While this is possible in new or closed developments, it is difficult to deploy in a system where there are already a large number of senders without a signing engine (e.g. the current email system).

An alternative way to deploy the system is to use it together with other email policy or spam filtering tools. Mails that arrive at the recipient or the recipient's messaging server may be filtered for spam or unwanted content using filter criteria. For example, a spam filter (e.g., SpamAssasin) may be installed on the messaging server. Or a virus scanner may filter incoming messages on the recipient's equipment. In such a scenario there is the problem of false positives. A message that the recipient wants to receive (e.g., an email informing him that he was accepted by a university) might be rejected by the spam filter because it is similar to spam message from an online lottery site as both start with the word "Congratulations." The recipient's messaging server may attempt to verify the signature of both of the above messages. If the content based filter determines a message is likely Spam, but it is signed by a trusted sender (e.g. the university that sent out the acceptance notice) it may still choose to deliver the message to the recipient. A anti-spam service provider may verify a number of senders and certify them as being trusted. The service provider could then offer the signature verification service to operators of messaging servers that want to separate spam out more reliably. The service provider might provide internet service providers with a specialized server that handles messages signed by public keys from organizations that are customers of the service provider. The signature-based classification of messages as trusted may be used together with any other number of spam detection techniques.

The signature verification and filtering may alternatively be performed on the recipient's equipment. If a recipient's equipment encounters a message it considers unwanted or dangerous, it may decide to discard the message. However, if the message is signed by a trusted sender, it may instead decide that the message is trusted and deliver it to the recipient. For example, many virus scanners that may be installed on recipient's equipment 20 currently block certain attachment types (e.g., executables). With signed messages, the recipient's equipment may instead be instructed to accept messages from trusted senders. Another example is spam filters that are built into clients. Such a spam filter may be instructed to always deliver signed messages from organizations that are trusted.

Another application of signatures are forged messages that attempt to trick the user into giving out information or try to mislead him into doing things that are not in his interest. An example of such a message is an email that pretends to be from a recipient's bank and which asks the user to go to a web site and enter his banking password. The web site, however, is controlled by a malicious third party that uses it to obtain the password of the user which it then can use to, for example, transfer money from the recipient's account, etc.

Using signatures, such forged messages can be detected. For example, it can be required at either the sender's or the messaging server's (or both) signature verification engine that all message from the bank (e.g. all message from the domain "bank.com") must be signed. Otherwise the messages will be marked as questionable, discarded or another action will be taken. The bank ensures that all messages to the customer are signed when they are sent out. The verification does not have to be limited to the domain. Any property of the message such as keywords, sender, embedded images, layout etc. can be used. For example, a messaging server can be programmed to verify a digital signature if a message contains the word "Citibank", contains an image with containing the Citibank name, or contains a URL or Linktext that includes the string "Citibank." A message with these properties that is not signed may be marked with header that in large, red writing warns the user that this is not an official Citibank message and it should be treated with care. An anti-forgery service provider may make an agreement with a number of senders that they want unsigned message filtered or marked wherever possible. Such a service provider may deploy filtering servers at message server operators (e.g., internet service providers) that give special treatment (e.g., filtering out) to all mail that follows certain criteria. The filtering service provider can be identical to the sender. The advantage for the sender is that by deploying servers to a few large messaging servers in the network (e.g. AOL, MSN and Yahoo for email) it can protect a large fraction of its customers from falsified email.

Operations involved in authenticating a message may be performed with a finer level of granularity. Forged emails may contain hyperlinks that attempt to direct the user to connect to an interactive server using some kind of networking protocol. For example, a forged email message may contain a hyperlink that, when the user clicks on it, will open a web browser and redirect him to a fake web site that asks him to give out confidential information (e.g., login credentials for the real bank site). To prevent this, a system may require messages containing links to be signed while other messages are accepted when they are unsigned. The system may also require individual hyperlinks to be signed. A user may always be able to activate a signed link, but the system may warn the user or prevent him from activating an unsigned link. The digital signature of the link could either be attached to the message or it could be embedded directly into the link. For example, a link could be structured as:

http://www.citibank.com?signature=82eD64a09lsMbP4

One advantage of signing individual links is that these links can be re-used in different messages. Another advantage is that they can be forwarded by the recipient. Enforcement of these restrictions can be performed at the messaging server or at the recipient's equipment.

Figure 2:
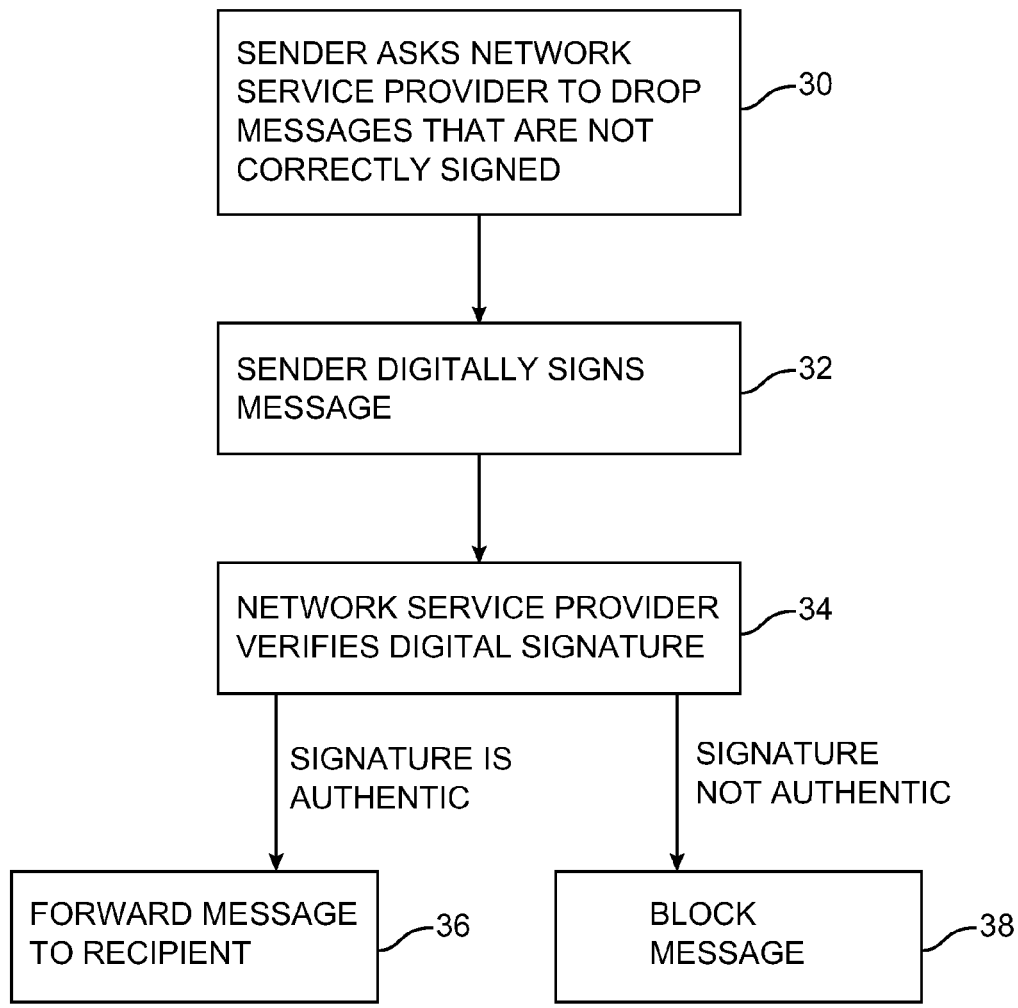
FIG. 2 is a flow chart of illustrative steps involved in using digital signatures on messages to authenticate messages at a network service provider in accordance with the present invention.

A flow chart of illustrative steps involved in using digital signatures on messages to authenticate messages at a network service provider is shown in FIG. 2.

At step 30, a sender may ask a network service provider (e.g., an internet service provider or ISP) to drop messages that are not correctly signed. The sender may, for example, fill out a web form provided by the ISP on a web site. The sender may be a company that distributes large amounts of email.

At step 32, the sender may digitally sign messages that are being sent to recipient.

When the network service provider receives the messages from the sender, the network service provider can identify them as originating with the sender by consulting a list (e.g., a list of domain names for which senders have requested that the service provider perform signature verification). At step 34, the network service provider can provide the requested signature verification functions by using a signature verification engine (such as engines 22 of FIG. 1).

If the signature is valid, the message may be forwarded to the recipient at step 36. If the signature is not authentic, the network service provider can block the message (i.e., decline to forward the message).

Figure 3:
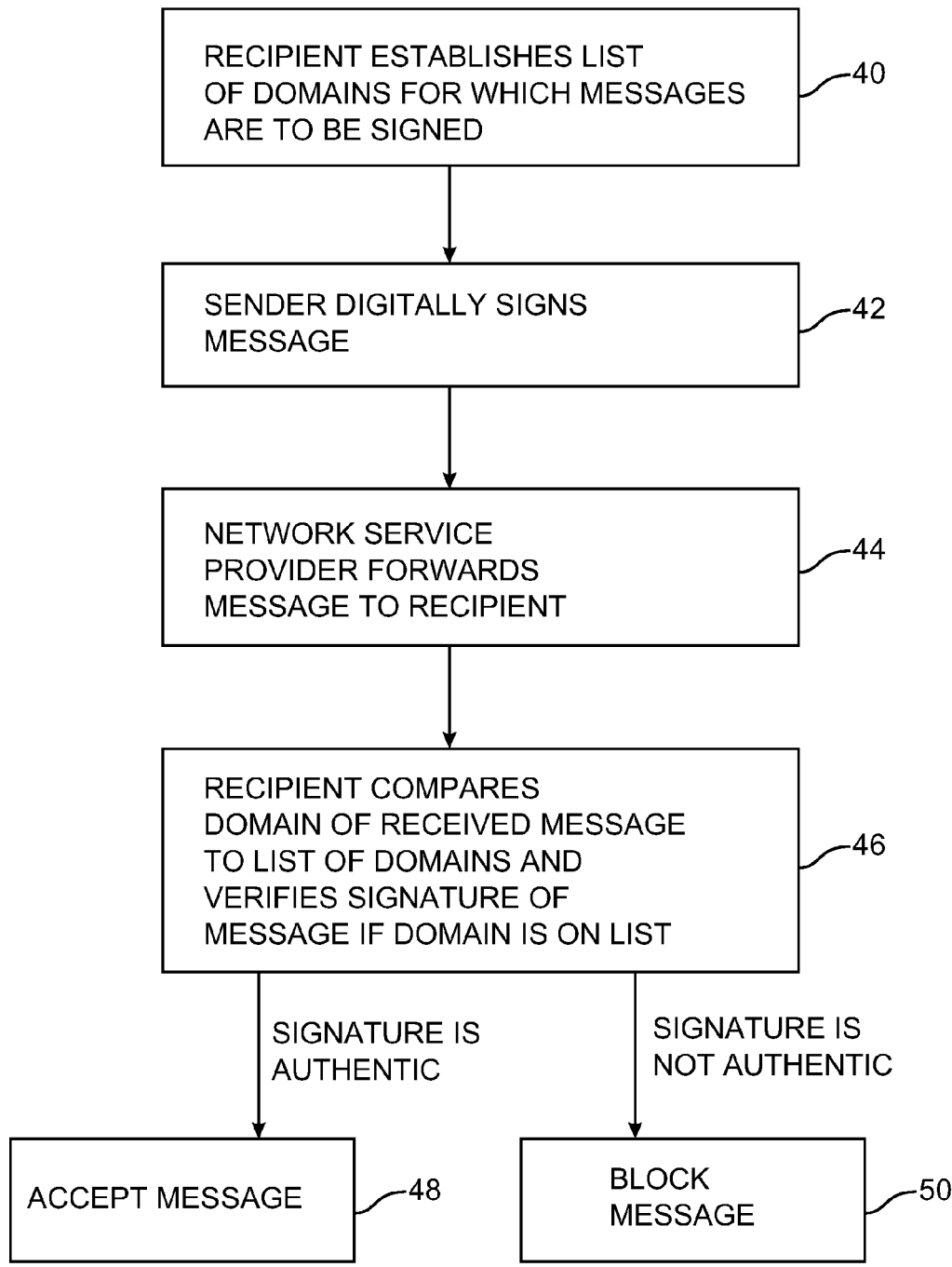
FIG. 3 is a flow chart of illustrative steps involved in using a list of domains specifying which messages are to be signed in accordance with the present invention.

If desired, the recipient can be actively involved in verifying signatures. A flow chart of illustrative steps involved when a recipient verifies digital signatures is shown in FIG. 3.

At step 40, the recipient creates a list of domains from which incoming messages should be checked for valid signatures.

At step 42, the sender sends a message to the recipient and digitally signs the message.

At step 44, the network service provider forwards the message to the recipient.

At step 46, the recipient compares the domain of the received message to the list of domains created at step 40. If there is a match, the recipient's software knows that the message should be checked. Accordingly, at step 46, a signature verification engine on the recipient's equipment is used to verify the digital signature for the message.

If the recipient determines that the signature is valid, the recipient can accept the message at step 48. If the recipient determines that the signature is not valid, the message can be blocked or otherwise treated as spam at step 50.

Figure 4:
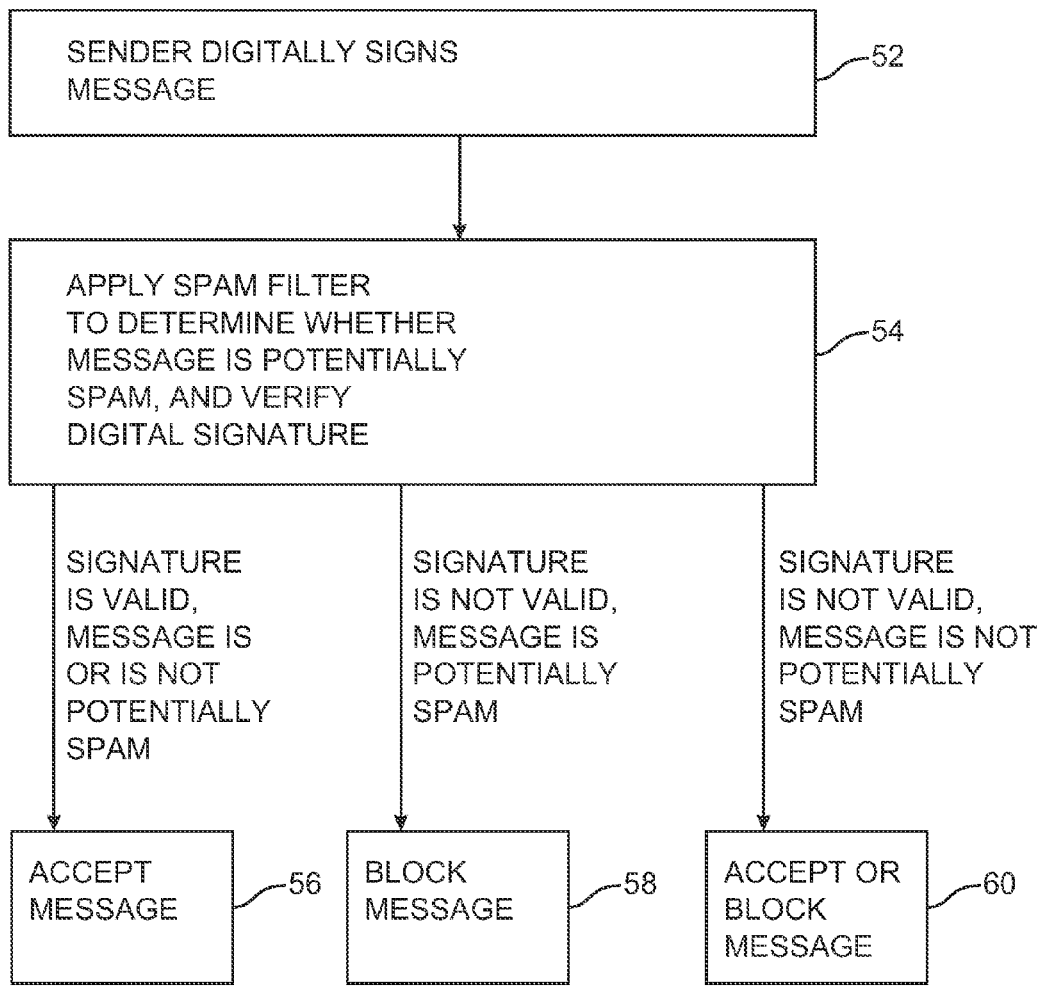
FIG. 4 is a flow chart of illustrative steps involved in using digital signatures to determine whether or not to accept certain messages in conjunction with a spam filter in accordance with the present invention.

The digital signature verification process may be used in conjunction with a spam filter, as shown in FIG. 4.

At step 52, a sender digitally signs and sends a message.

At step 54, an anti-spam filter is used to determine whether the message is potentially spam. The antispam filter may apply any suitable spam filter criteria in classifying the message. The antispam filter may be applied at any suitable location (e.g., at a gateway, a server such as a mail server, a network service provider such as an ISP, a recipient, etc.). In addition, the digital signature is processed using a signature verification engine at step 54 to determine whether the signature on the message is authentic.

If the signature is valid, the message can be accepted at step 56, whether or not the spam filter classified the message as being potentially spam.

If the signature is not valid and the spam filter classified the message as being potentially spam, the message can be blocked or otherwise treated as spam at step 58.

If the signature is not valid and the spam filter did not classify the message as being potential spam, the message can be accepted at step 60. Alternatively, because the signature was not valid, the recipient could handle this situation by blocking this type of message at step 60.

Figure 5:
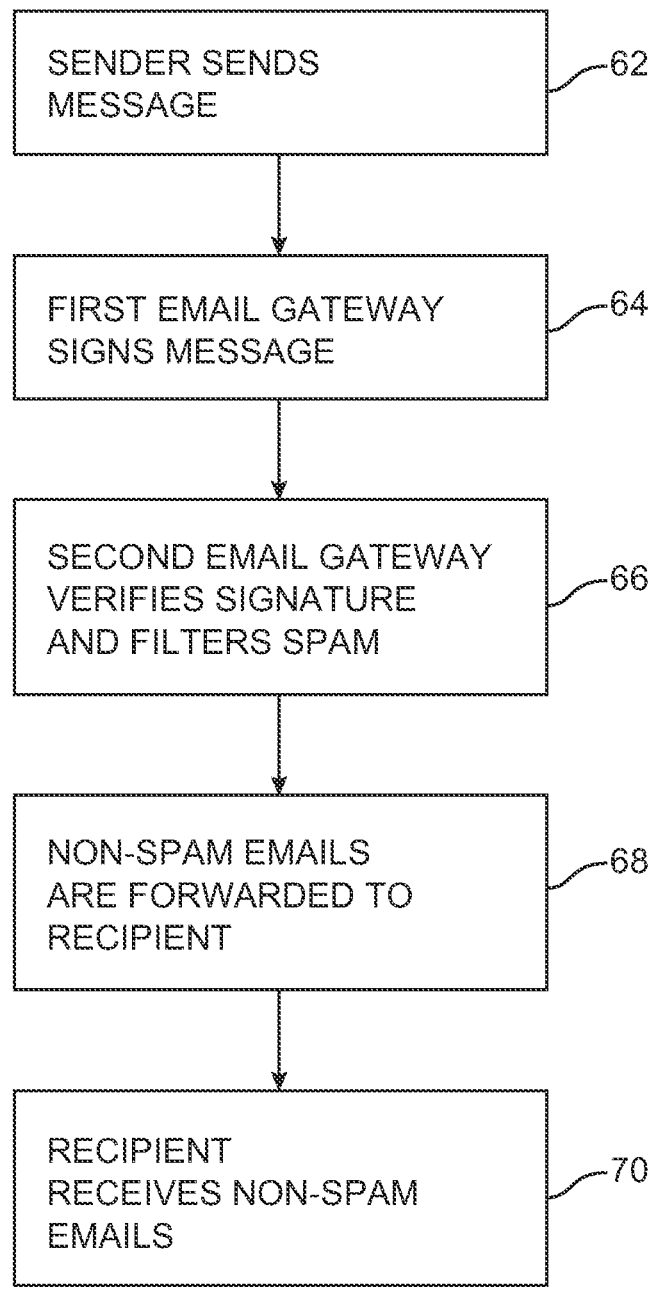
FIG. 5 is a flow chart of illustrative steps involved in using an email gateway approach to perform operations related to digitally signing email messages and verifying signatures in accordance with the present invention.

A flow chart of illustrative steps involved in using an email gateway approach to perform operations related to digitally signing email messages and verifying signatures is shown in FIG. 5. Email gateways may be any suitable mail servers or computers. In a typical arrangement, an email gateway is a mail server that resides at or near the edge of a local area network. For example, the email gateway of an organization may be a mail server that is used to send and receive that organizations email from the organization's network over the internet. As another example, an email gateway for an individual recipient may be that recipient's ISP.

At step 62, a sender sends a message to a recipient. At step 64, a first email gateway signs the message. The first email gateway may, for example, be an email gateway at a corporation that is sending a large amount of email to its customers (as an example).

At step 66, a second email gateway (e.g., an email gateway at a recipient's ISP) verifies the signature of the message sent at step 62. The second email gateway may also perform spam filtering operations using suitable spam filtering criteria.

At step 68, non-spam emails with valid signatures may be forwarded by the second email gateway to the recipient. At step 70, the recipient may receive these non-spam emails.

Figure 6:
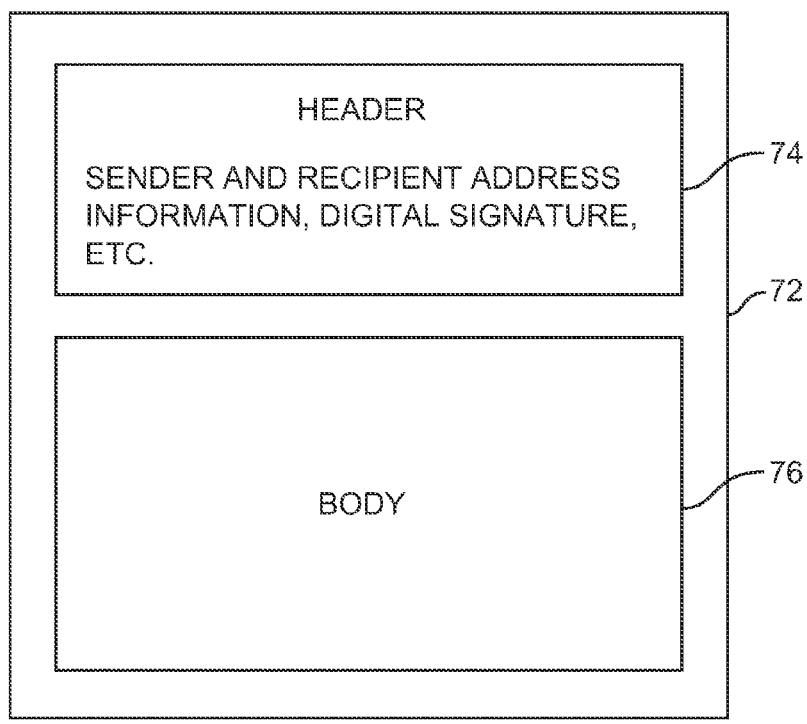
FIG. 6 is a diagram showing how a header of an email message may contain a digital signature in accordance with the present invention.

A digital signature may be provided with each email message as part of the message body, as part of a transmission that is separate from but associated with a message, or using any other suitable technique. As shown in FIG. 6, a digital signature for a message 72 may be provided in the email header 74. The message (i.e., both the header 74 and body 76) may be an email message or any other suitable message.

It may be desirable to remove spaces and other characters from an email message before calculating a digital signature. A flow chart of illustrative steps involved in processing a message to remove special characters before digitally signing the message is shown in FIG. 7.

Figure 7:
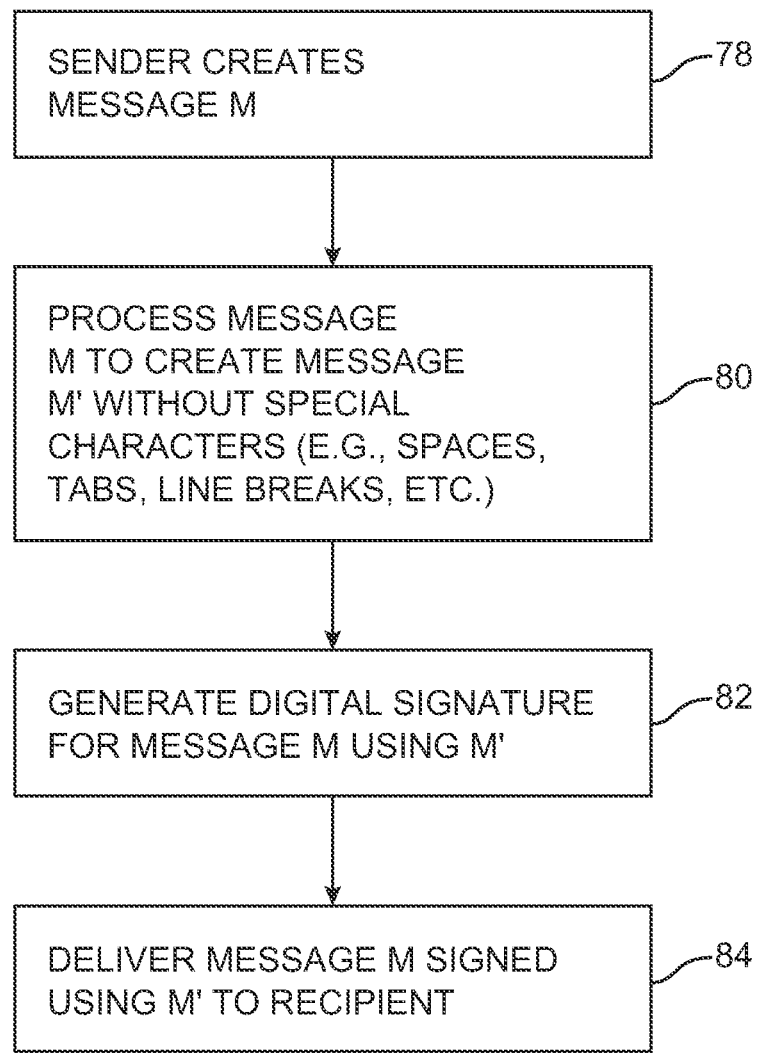
FIG. 7 is a flow chart of illustrative steps involved in processing a message to remove special characters before digitally signing the message in accordance with the present invention.
Figure 8:
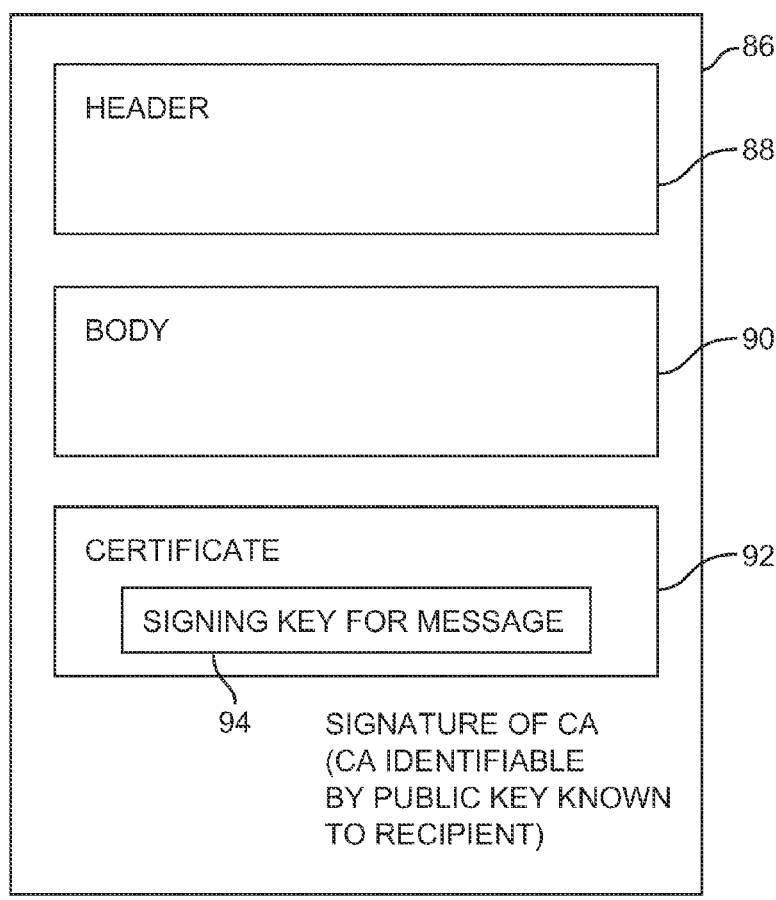
FIG. 8 is a diagram showing how a message may be authenticated by attaching a certificate containing a signing key for the message in accordance with the present invention.

As shown in FIG. 7, at step 78 the sender may initially create a message M.

At step 80, prior to signing the message (e.g., at the sender or a gateway or other suitable signing entity), the message M may be processed to create a message M' without special characters such as spaces, tabs, line breaks, etc.

At step 82, the digital signature for the message M may be calculated using a signing engine 14 (FIG. 1) based on the processed message M'.

At step 84, the digitally signed message M with the digital signature that was calculated based on processed message M' may be delivered to the recipient (or other suitable intermediate entity) for signature verification.

A diagram showing how a message may be authenticated by attaching a certificate containing a signing key for the message in accordance with the present invention. Message 86 contains a message header 88 that includes information such as sender and recipient email addresses, subject line information, etc. Message 86 may also contain a message body 90 such as text for the recipient to read. The message 86 may contain a digital certificate 92 that includes a signing key 94 that is to be verified. The certificate 92 may be digitally signed by a certificate authority, to prove that the signing key 94 has not been altered during transit.

Figure 9:
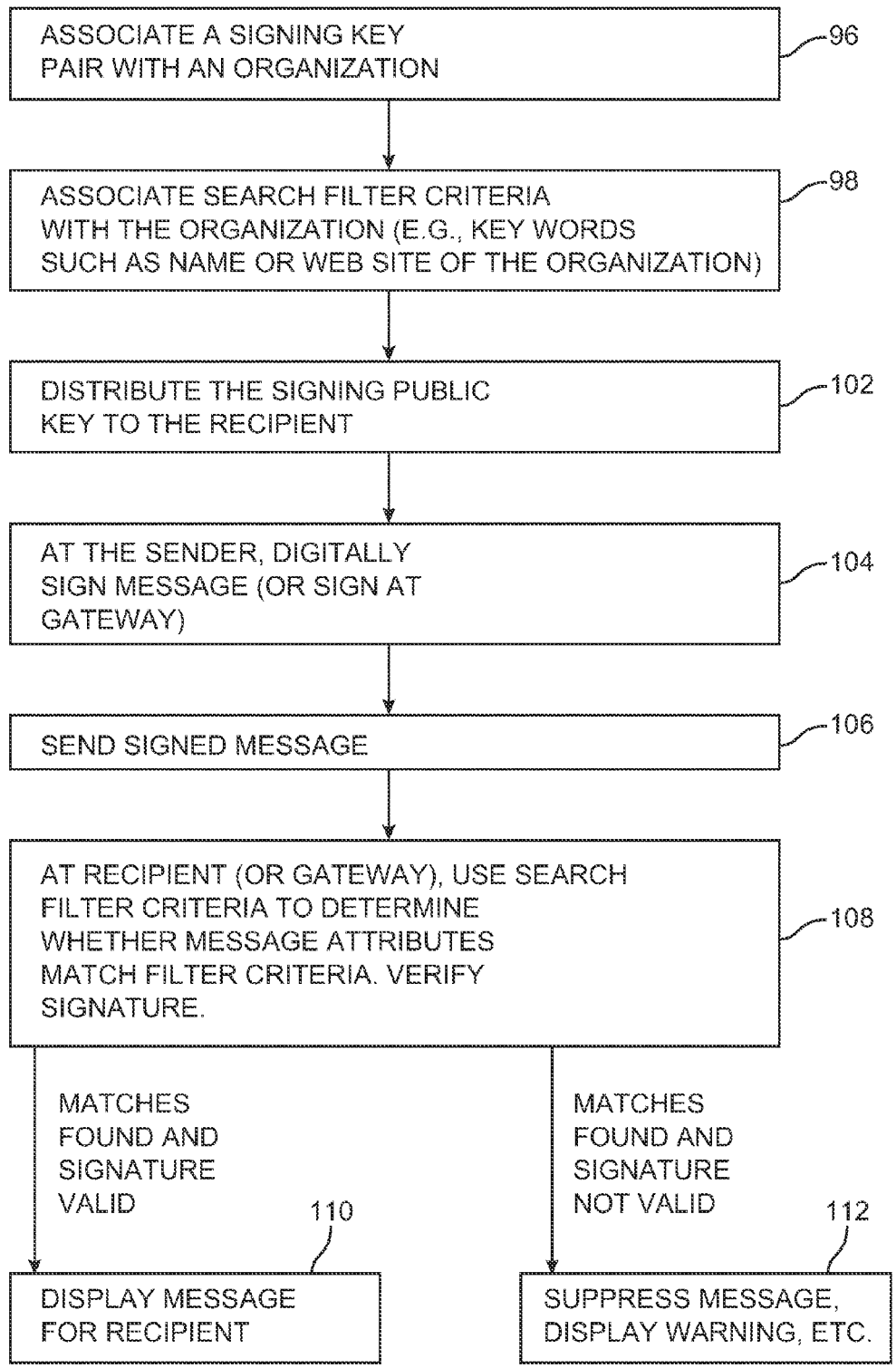
FIG. 9 is a flow chart of illustrative steps involved in using filter criteria and digital signatures to determine whether or not to present messages to a recipient in accordance with the present invention.

A flow chart of illustrative steps involved in using filter criteria and digital signatures to determine whether or not to present messages to a recipient is shown in FIG. 9.

At step 96, a key pair is associated with an organization. The organization uses one key in the key pair to digitally sign messages. The other key is used by the recipient to verify the authenticity of the digital signatures. In a typical scenario, the organization maintains its private key as a secret and uses this key in signing messages. The matching public key is published (e.g., on a publicly-available server) so that the recipient can obtain a copy when needed.

At step 98, appropriate search filter criteria may be associated with the organization. Any suitable filter criteria may be used as search filter criteria, such as keywords that are associated with the organization including the organization's name, web site address, domain name, etc. The search criteria may be provided to filtering software at an ISP, at the recipient, etc. The purpose of the search criteria is to establish attributes that associate messages with certain organizations.

At step 102, the signing public key is distributed to the recipient.

At step 104, the sender (or an intermediate entity authorized by the sender such as an email gateway or other service provider) digitally signs the message using the sender's private key.

At step 106, the digitally signed message is sent to the recipient.

At step 108, the search filter criteria created at step 98 are used to determine whether the message is associated with the sending organization and therefore requires digital signature verification. The digital signature can also be verified (authenticated). If the search criteria match attributes in the message (e.g., if the message contains the name of the organization or has a sending address associated with the organization's domain) and the signature is valid, the message can be provided to the recipient as normal mail at step 110. If matches between the search filter criteria and the message attributes were found but the signature was not valid, the message can be suppressed or otherwise treated as not being legitimate email. For example, the recipient's client software can display the message in list accompanied by a prominent warning such as "this message appears to be a fake, proceed with caution."

Figure 10:
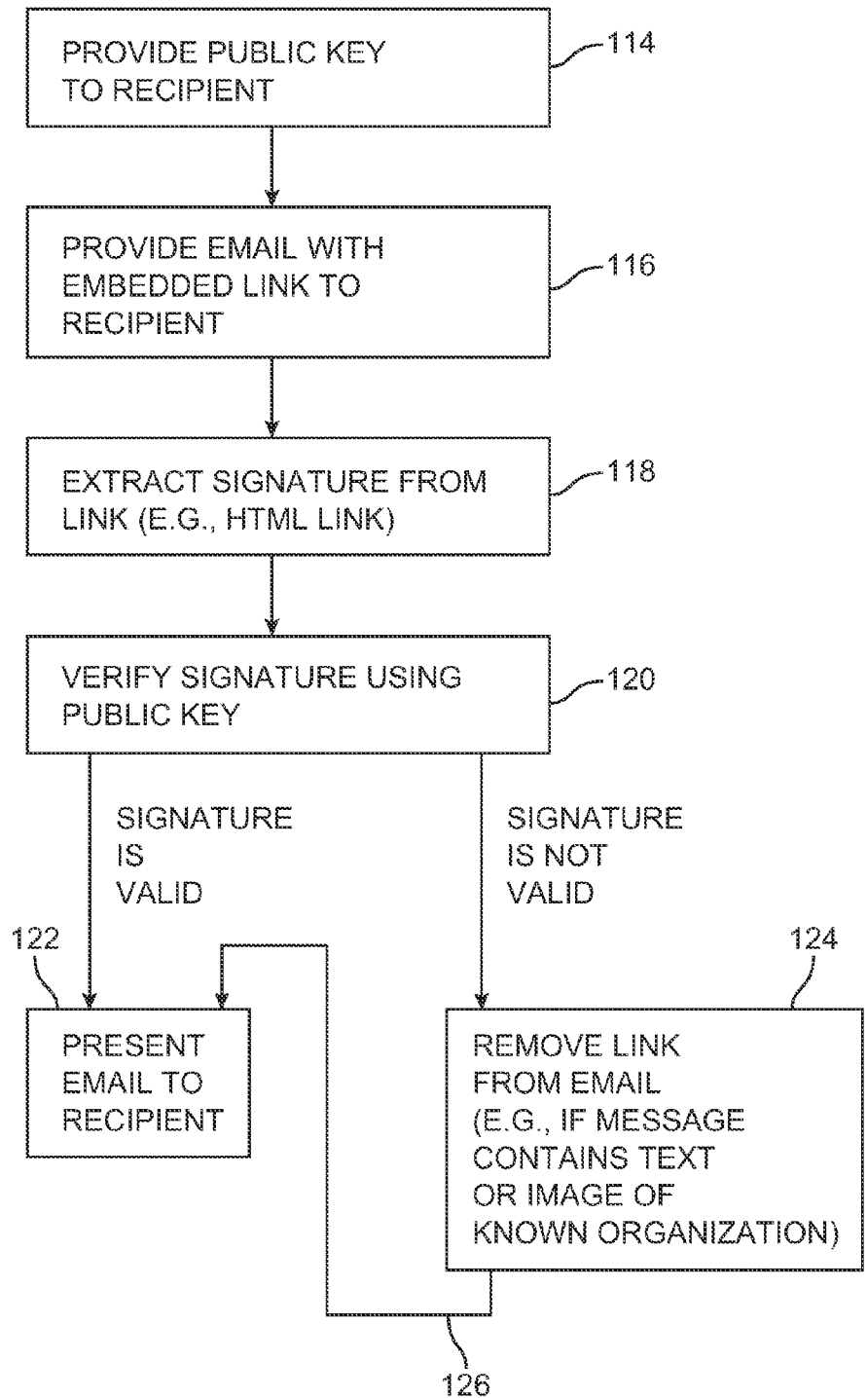
FIG. 10 is a flow chart of illustrative steps involved in using digital signatures to determine whether links embedded in email messages are legitimate or should be removed in accordance with the present invention.

Sometimes emails contain hyperlinks that are of uncertain origin. Because clicking on a link provided by a malicious sender may cause damage to the recipient's computer system, care must be taken when handling these messages. A flow chart of illustrative steps involved in using digital signatures to determine whether links embedded in email messages are legitimate or should be removed is shown in FIG. 10.

At step 114, a public key (i.e., the public key in a private-key/public-key pair used for digital signatures) is provided to a recipient. The public key and other information distributed to the entities in system 10 may be provided electronically (e.g., in a message, as a download, as part of a software installation procedure, etc.).

At step 116, an email with an embedded link may be sent to and received by the recipient.

To verify that the link is not harmful, the recipient may examine the link and extract the digital signature from the link (e.g., an html link) at step 118.

The digital signature extracted from the link at step 118 can be verified using a verification engine (e.g., a verification engine such as verification engines 22 of FIG. 1) at step 120.

If the signature is valid, the link has been created by an authorized sender and can be presented to the recipient as part of the original email message at step 122 (i.e., the recipient is provided with an unfiltered email containing the link).

If, however, no valid signature is present in the link, the link may be expunged from the email at step 124. The email without the link may then be presented to the recipient at step 122, as shown by line 126. As described in connection with FIG. 9, certain filter criteria may be associated with organizations such as the organization's name, web address, etc. If desired, the link removal process of step 124 may be made contingent on identifying information in the text or graphics of the email that matches the filter criteria. For example, the link will only be removed if there is no digital signature and the email contains information purporting that the sender of the email is Citibank. When the email has content that corresponds to a list of known organizations, the links can be removed without concern that a valid link is being removed. In the present example, Citibank is an illustrative bank identified by the filter criteria as being an organization whose links should contain digital signatures.

The foregoing is merely illustrative of the principles of this invention and various modifications can be made by those skilled in the art without departing from the scope and spirit of the invention.

What is claimed is:

1. A method for using digital signatures to authenticate messages, the method comprising:
   at a recipient, creating a list of domains, wherein the list of domains includes one or more domains from which all incoming messages from the one or more domains are to be checked for valid signatures;
   at a sender at a given domain within the list of domains, digitally signing a message to create a digital signature and sending the message together with the digital signature to the recipient;
   at the recipient, extracting from the message the given domain of the sender;
   at the recipient, comparing the extracted given domain of the sender the list of domains; and
   at the recipient and based on the given domain matching a domain in the list of domains, verifying the digital signature.

2. The method defined in claim 1 further comprising:
   at the recipient, based on the given domain matching a domain in the list of domains, and based on the digital signature being verified to be authentic, accepting the message; and
   at the recipient, based on the given domain matching a domain in the list of domains, and based on the digital signature not being verified to be authentic, blocking the message as spam.

3. The method defined in claim 1 further comprising:
   at an additional sender at an additional given domain outside the list of domains, sending an additional message to the recipient;
   at the recipient, comparing the additional given domain to the list of domains; and
   at the recipient and based on the additional given domain not matching a domain in the list of domains, accepting the additional message.

4. A method for suppressing a fake email message that attempts to trick a recipient into believing that the fake email message was sent by an organization with which the recipient has a relationship, wherein the organization has an associated private key, the method comprising:
   receiving an email message, the email message including information indicating that the message originated from the organization;
   determining that an email message has attributes that match the search filter criteria, wherein the search filter criteria includes information to specifically identify the organization;
   determining that the email message does not have a digital signature created using the private key associated with the organization; and based on determining that the email message has attributes that match the search filter criteria and determining that the email message does not have a digital signature created using the private key associated with the organization, performing at least one action selected from the group consisting of: suppressing the email message, treating the email message as an illegitimate email, and displaying a warning message.

5. The method defined in claim 4 wherein determining that the email message does not have a digital signature created using the private key associated with the organization comprises:
  determining that the email message has an invalid digital signature.

6. The method defined in claim 4 wherein determining that the email message does not have a digital signature created using the private key associated with the organization comprises:
  determining that the email message has a digital signature created using an additional private key that is not associated with the organization.

7. The method defined in claim 4 wherein determining that the email message does not have a digital signature created using the private key associated with the organization comprises:
  determining that the email message does not have any digital signatures.

8. The method defined in claim 4 wherein the action comprises suppressing the email message.

9. The method defined in claim 4 wherein the action comprises treating the email message as an illegitimate email.

10. The method defined in claim 4 wherein the action comprises displaying the warning message, wherein the warning message comprises a warning for the recipient that the message appears to be fake.

11. The method defined in claim 4 further comprising:
  receiving an additional email message, the additional email message including information indicating that the message originated from the organization;
  determining that the additional email message has attributes that match the search filter criteria;
  determining that the additional email message has a digital signature created using the private key associated with the organization; and
  based on determining that the additional email message has attributes that match the search filter criteria and determining that the additional email message has a digital signature created using the private key associated with the organization, displaying the additional email message for the recipient.

12. The method defined in claim 11 further comprising:
  at the organization, digitally signing the additional email message using the private key associated with the organization.

13. The method defined in claim 12 wherein digitally signing the additional email message comprises using an email gateway associated with the organization to digitally sign the additional email message.

14. The method defined in claim 4 wherein the search filter criteria comprise a list of keywords that are associated with the organization.

15. The method defined in claim 4 wherein the search filter criteria comprise a list of keywords that are associated with the organization and wherein the keywords comprise at least one keyword selected from the group consisting of: a name of the organization, a web site address of the organization, and a domain name of the organization.

16. A method for using digital signatures to authenticate messages, the method comprising:
  receiving a message from a given domain name,
  extracting the given domain name from the incoming message;
  determining that the extracted given domain name is contained within a list of domains from which all incoming messages are to be checked for valid signatures;
  determining that the message does not have a digital signature associated with the given domain name; and
  in response to determining that the given domain name is contained within the list of domains from which incoming message are to be checked for valid signatures and that the message does not have a digital signature associated with the given domain name, performing at least one action selected from the group consisting of: suppressing the message, treating the message as being illegitimate, and displaying a warning message.

17. The method defined in claim 16 further comprising:
  receiving an additional message from an additional given domain name;
  determining that the additional given domain name is contained within the list of domains from which incoming messages are to be checked for valid signatures;
  determining that the additional message has a valid digital signature associated with the additional given domain name; and
  in response to determining that the additional given domain name is contained within the list of domains from which incoming messages are to be checked for valid signatures and that the additional message has a valid digital signature associated with the additional given domain name, accepting the additional message.

18. The method defined in claim 16 further comprising:
  receiving an additional message from an additional given domain name;
  determining that the additional given domain name is not contained within the list of domains from which incoming messages are to be checked for valid signatures; and
  in response to determining that the additional given domain name is not contained within the list of domains from which incoming messages are to be checked for valid signatures, accepting the additional message.

19. The method defined in claim 16 wherein determining that the message does not have a digital signature associated with the given domain name comprises:
  determining that the message has a digital signature created using a private key that is not associated with the given domain name.

20. The method defined in claim 16 wherein determining that the message does not have a digital signature associated with the given domain name comprises:
  determining that the message does not have a digital signature.

* * * * *